W. L. HOLT.
SIDE HARROW AND CULTIVATOR ATTACHMENT.
APPLICATION FILED SEPT. 7, 1918.
1,289,764.
Patented Dec. 31, 1918.
2 SHEETS—SHEET 1.
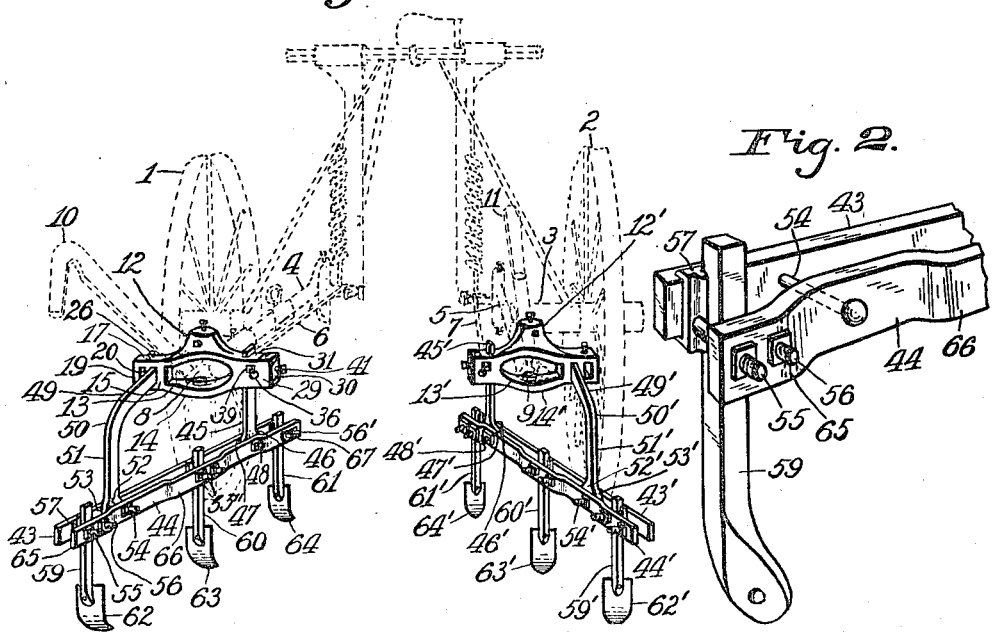
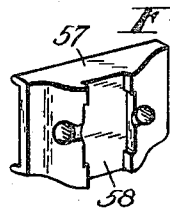
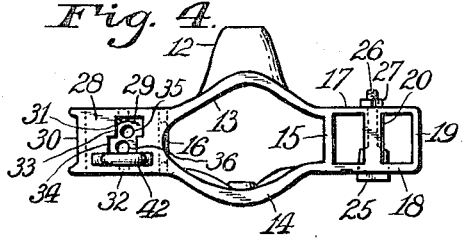
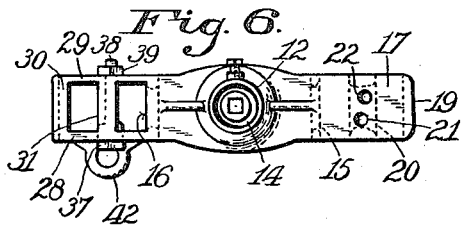
WITNESS:
H. E. Heaton.
F. M. Roeder
INVENTOR:
William L. Holt,
BY
E. T. Silvius,
ATTORNEY.

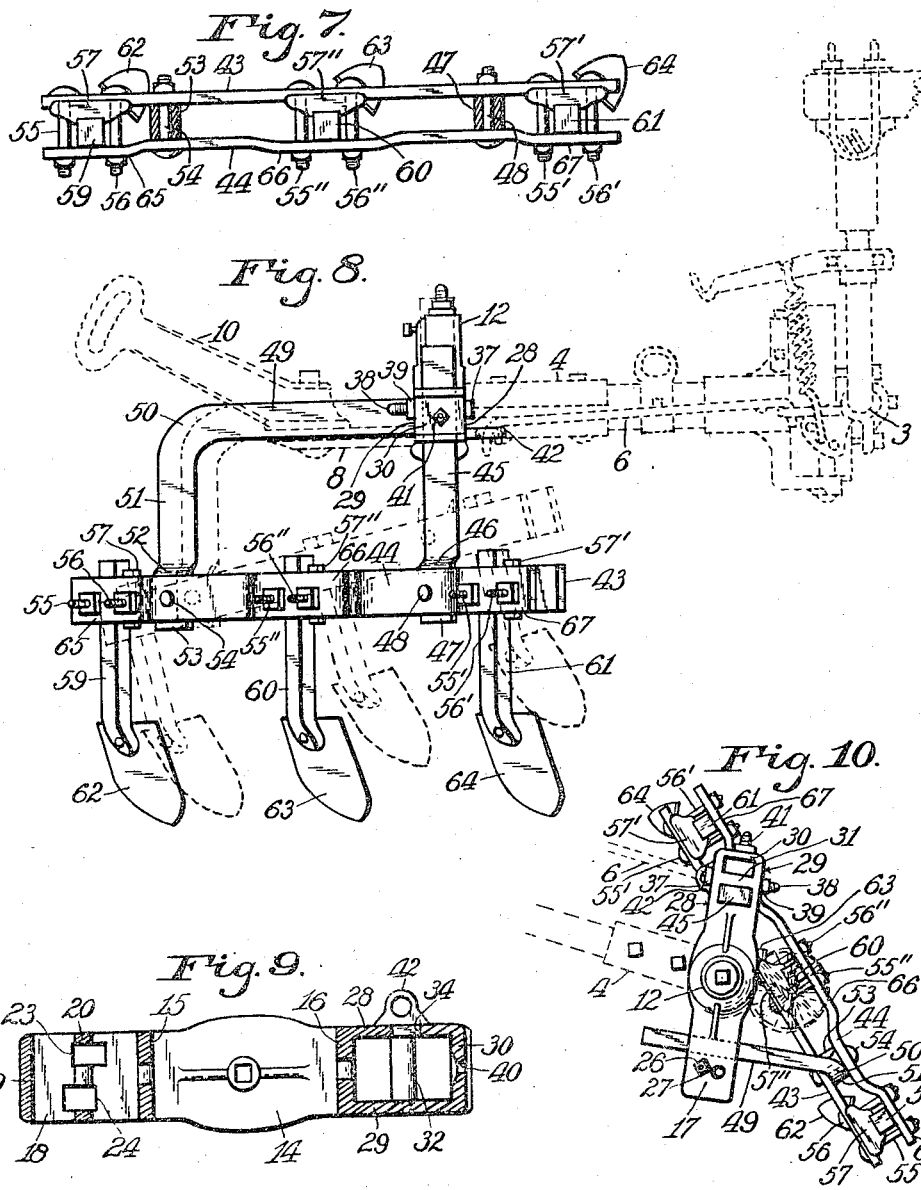

UNITED STATES PATENT OFFICE.

WILLIAM L. HOLT, OF VINCENNES, INDIANA, ASSIGNOR TO HARTMAN MANUFACTURING COMPANY, OF VINCENNES, INDIANA, A CORPORATION OF INDIANA.

SIDE-HARROW AND CULTIVATOR ATTACHMENT.

1,289,764.

Specification of Letters Patent.  Patented Dec. 31, 1918.

Application filed September 7, 1918. Serial No. 253,068.

*To all whom it may concern:*

Be it known that I, WILLIAM L. HOLT, a citizen of the United States, residing at Vincennes, in the county of Knox and State of Indiana, have invented a new and useful Side-Harrow and Cultivator Attachment, of which the following is a specification, reference being had to the accompanying drawings and to the letters and figures of reference marked thereon.

This invention relates generally to cultivators of the type that has a gang or two gangs of cultivating implements, whether constructed as a walking cultivator or a riding cultivator, the invention having reference more particularly to improvements with respect to the apparatus described in Letters Patent No. 1,020,202 dated March 12, 1912.

An object of the invention is to provide a side harrow attachment which shall be so constructed as to be readily applied to cultivator machines, and more particularly to enable the type of machine described in said Letters Patent to perform a greater variety of operations, so as to obviate the necessity of buying and maintaining a separate complete machine to perform each of the several operations required for cultivating a variety of crops.

Another object is to provide a side harrow and cultivator attachment of such construction as to be adapted to be connected with the crosshead described in said Letters Patent and permit the alternative connection with the crosshead of cultivating implements of either the spring-toothed type or the spring-trip type, by the user as occasion may require.

A further object is to provide a side harrow and cultivator attachment which shall be so constructed as to be adapted to be adjusted to the sloping side of ridges or beds in which rows of cotton or of tobacco or of other crops may be planted; which attachment shall be adapted to be separately manufactured and shipped to the user in condition to be readily applied to machines primarily designed for cultivating or harrowing generally; in order that efficiency may be economically attained, and to the end that manufacture and repairs may be expeditiously and economically accomplished.

With the above-mentioned and other objects in view, the invention consists in certain novel improvements in cultivator gangs, also in a novel side harrow attachment for cultivators, and further in the parts and combinations and arrangements of parts as hereinafter particularly described and further defined in the appended claims.

Referring to the drawings,—Figure 1 is a rear perspective view of the novel side harrow and cultivator attachment arranged in relation to a cultivator machine shown in broken lines, the machine being of the walking cultivator type described in said Letters Patent; Fig. 2 is a perspective view on an enlarged scale of a portion of one of the important features of the improvement; Fig. 3 is a rear elevation of one of a pair of crossheads in which improvements have been made, whereby the side harrow attachment is advantageously operated and controlled; Fig. 4 is an elevation of the forward side of the improved crosshead; Fig. 5 is a perspective view of one of the shank seats of the side harrow attachment; Fig. 6 is a top plan of Fig. 4; Fig. 7 is a top plan of a gang of cultivator implements constructed in accordance with the invention, the connecting attachments of the gang being in section; Fig. 8 is a side view of one of the gangs of cultivator implements in which an adjusted position thereof is shown by broken lines; Fig. 9 is a horizontal section on the line IX—IX in Fig. 3; and, Fig. 10 is a top plan of one of the gangs of cultivator implements.

In the various figures of the drawings similar reference characters indicate corresponding parts or features of construction herein referred to in detail.

The well known parts of a cultivator of familiar construction are briefly referred to in order to give a clear understanding of the objects and functions of the invention; the cultivator machine illustrated by broken lines comprising two wheels 1 and 2 and an arched axle 3 with which two beams 4 and 5 are pivotally connected at their forward ends, two parallel rods 6 and 7 being pivotally connected also with the axle to maintain the cultivator gangs in proper arrangement relatively to the axle of the machine.

As described in said Letters Patent the machine includes two crossheads which have been improved, the two being substantially alike but arranged in relatively reverse order and comprise main central portions that are pivotally connected with pivotal members 8 and 9 of the beams 4 and 5 respectively, said members having handles 10 and 11 thereon for guiding and controlling the gangs of cultivating implements, respectively, as described in said Letters Patent. Thus the crossheads comprise central portions 12 and 12' in which are openings 13 and 13' and bottom plates 14 and 14' respectively, the openings receiving the pivotal portions 8 and 9 respectively.

Various sockets are formed in each crosshead, and to this end two vertical walls 15 and 16 are formed so as to connect the upper or main portion and the bottom portion of the crosshead together, the walls being a suitable distance apart, and preferably are apertured; and a plate 17 extends horizontally from the main portion 12 beyond the wall 15, a bottom plate 18 extending from the bottom portion 14 beyond the wall 15 parallel with the plate 17, an end wall 19 being integrally connected to the plates 17 and 18; and a partition 20 is integrally connected with the plates 17 and 18 midway between the walls 15 and 19, the partition being apertured, so that two horizontally extending sockets are formed in one end portion of the crosshead to receive various types of devices. The top plate 17 has two bolt holes 21 and 22 therein that are arranged above the aperture in the partition 20, one hole being relatively nearer than the other to the partition 15, being relatively close to one of the sockets, the other hole being nearer to the companion one of the sockets. The bottom plate 18 has two keyways 23 and 24 therein below the bolt holes for the two sockets respectively, one keyway extending from the partition 20 farther than the other toward the wall 15, the remaining socket extending relatively nearer to the wall 19. A tapering key 25 is provided which is insertible into either one of the two keyways and it has a securing bolt 26 thereon extending through the opposite one of the bolt holes and provided with a nut 27 to engage the top of the plate 17. The opposite end portion of the crosshead comprises two vertical plates 28 and 29 that extend from the main portion beyond the wall 16, an end wall 30 connecting the vertical plates together, there being a horizontal partition bar 31 connected with the upper portions of the plates 28 and 29 and a similar bar 32 connected with the lower portions of the plates midway between the walls 16 and 30, to form two vertical sockets wherein to receive various devices. One of the vertical plates has a horizontal keyway 33 therein relatively closer to the wall 16 than to the wall 30 and also a similar keyway 34 relatively closer to the wall 30 than to the wall 16, portions of the keyways preferably being in communication each with the other. The opposite vertical plate 29 has a horizontal bolt hole 35 therein opposite to the keyway 33 and a bolt hole 36 opposite to the keyway 44. A tapering key 37 is provided which is insertible into either one of the keyways 33 and 34 and it has a securing and adjusting bolt 38 thereon to be inserted into either one of the bolt holes 35 and 36, and is provided with an adjusting and securing nut 39 to engage the plate 29. The end wall 30 of each crosshead has a bolt hole 40 therein receiving a bolt 41 whereby to secure an implement holder to the crosshead as heretofore, and the vertical plate 28 has an eye 42 thereon which, being on the forward portion of each crosshead is connected with the parallel rod 6 to maintain the crosshead parallel with the axle of the sulky.

The side harrow and cultivator attachment more essentially comprises two improved gang frames and novel devices whereby to detachably connect the frames to the crossheads, and especially so as to be adjustable relatively to the crossheads. One gang frame comprises two frame bars 43 and 44, the other comprising two similar bars 43' and 44'. One gang frame is provided with a guiding and connecting bar 45 that is adapted to be secured in vertical arrangement in either one of the vertical sockets in one of the crossheads, the companion gang frame being provided with a similar guiding and connecting bar 45' adapted to be secured similarly in one of the vertical sockets of the companion crossheads. The guiding bars have axially twisted portions 46 and 46' from which extend pivot portions 47 and 47' respectively that are connected to the forward portion of the gang frames by means of pivots 48 and 48' respectively. The gang frames are provided also with combined drawing and guiding bars which comprise horizontally arranged portions 49 and 49' respectively that are secured in one of the two horizontal sockets in the crossheads respectively, curved portions 50 and 50' extending downwardly from the horizontally arranged portions, and vertical portions 51 and 51' extending downwardly from the curved portions so as to be at approximately right angles to the horizontally arranged portions of the bars. The portions 51 and 51' have axially twisted portions 52 and 52' from which extend pivotal portions 53 and 53' respectively that are connected by means of pivots 54 and 54' with the rearward portions of the gang frames respectively, between the two bars thereof. Thus constructed and arranged the forward portion of each gang frame may be adjusted so as to elevate or lower it relatively to the rearward portion of the frame, the adjustment being permitted by adjusting the combined drawing and guiding bar horizontally in the crosshead.

For the purpose of connecting the two bars of each of the gang frames together and securing cultivator tooth or shovel shanks thereto, the two bars are each provided with clamp bolts 55 and 56 and also other pairs of similar bolts 55', 56' and 55", 56", there being a pair of bolts for each implement shank, in different cases a different number of teeth or shovels being desired; and, according to the number desired, a plurality of shank seats 57 and 57', 57" are arranged between the two frame bars and seated against one of them and suitably connected with a pair of the clamp bolts, each spring seat having a recess 58 in its front to receive and hold a shank 59 in vertical arrangement, additional shanks 60, 61, being provided as may be required, the shanks having teeth or shovels 62, 63, 64 thereon respectively, for one gang, the companion gang having shanks 59', 60' and 61' provided respectively with cultivator teeth or shovels 62', 63' and 64' respectively. Preferably one bar of each gang frame is straight and has the shank seats connected therewith, the opposite bar of the frame preferably having off-set portions 65, 66, 67 arranged opposite to the spring seats and having direct contact with the implement shanks.

In practical use the machine is drawn forward as usual while the cultivating gangs are controlled by means of the handles 10 and 11 or otherwise as may be designed, the gangs being suitably equipped as may be necessary either with shovels or with teeth, as will be understood. The forward portions of the gangs may be raised or lowered to accommodate the machine to any size or angle of ridge or bed in which a crop may be growing, so that the forward or inner shovels or teeth working adjacent to the row of plants shall properly cultivate the ground of the ridge while the rearward teeth cultivate the relatively lower ground. In case conditions make it desirable the forward ends of the gang frames may be adjusted to relatively lower positions then the rearward ends.

Having thus described the invention, what is claimed as new is—

1. A side harrow and cultivator attachment including a gang frame, means for securing a plurality of implement shanks to the gang frame, a guiding bar pivotally connected to the gang frame, and a combined drawing and guiding bar also pivotally connected to the gang frame.

2. A side harrow and cultivator attachment including a gang frame, means for securing a plurality of implement shanks to the gang frame, an approximately straight guiding bar pivotally connected to the gang frame, and an angular combined drawing and guiding bar also pivotally connected to the gang frame.

3. A side harrow and cultivator attachment including two gang frame bars, two pivots connected to the frame bars, a plurality of pairs of bolts connected to the frame bars, a plurality of shank seats arranged between and seated on one of the two frame bars, each shank seat being connected with a pair of the bolts, a guiding bar connected to one of the pivots, and a combined drawing and guiding bar connected to the remaining one of the pivots.

4. A side harrow and cultivator attachment including a crosshead and means to draw and guide the crosshead horizontally, a guiding bar rigidly secured vertically to the crosshead, a gang frame connected near its forward end to the guiding bar, a combined drawing and guiding bar having a main portion horizontally secured rigidly to the crosshead and a relatively angular portion extending downward from the main portion and connected to the rearward portion of the gang frame, and implement shanks secured to the gang frame.

5. A side harrow and cultivator attachment comprising two gang frame bars, one of the bars being straight and the other having off-set portions, two pivots connected to the frame bars between the off-set portion of said one of the bars, a plurality of shank seats arranged between the frame bars and seated on said straight bar opposite to said off-set portions, a plurality of pairs of bolts connected to the straight bar and to the off-set portions of the other of the two frame bars, each pair of bolts being connected with a shank seat, a guiding bar having an axially twisted portion connected to one of the pivots, and a combined drawing and guiding bar having two relatively angular portions of which one portion has an axially twisted portion that is connected to the remaining one of the said pivots.

6. In a side harrow and cultivator attachment, a horizontal crosshead with two horizontal sockets in one end portion thereof, the bottom of said end portion having two vertical keyways therein arranged for the two sockets respectively, the top of said end portion having two bolt holes therein above said keyways respectively, with two vertical sockets in the opposite end portion of the crosshead, one vertical side of said opposite end portion having two horizontal keyways therein arranged for the two vertical sockets respectively, the opposite vertical side of said opposite end portion of the crosshead having two bolt holes therein opposite to said horizontal keyways respectively, a key in one of said vertical keyways and having a bolt thereon extending through the opposite one of said bolt holes, and a key in one of said horizontal keyways and having a bolt thereon extending through the opposite one of said bolt holes.

In testimony whereof, I affix my signature.

WILLIAM L. HOLT.

Copies of this patent may be obtained for five cents each, by addressing the "Commissioner of Patents, Washington, D. C."